(12) United States Patent
Özel et al.

(10) Patent No.: US 7,028,734 B2
(45) Date of Patent: Apr. 18, 2006

(54) TRUCK TIRE WITH CAP/BASE CONSTRUCTION TREAD

(75) Inventors: Fahri Özel, Eischen (LU); Michel Pierre Charles Robert, Sibert (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 184 days.

(21) Appl. No.: 10/602,360

(22) Filed: Jun. 24, 2003

(65) Prior Publication Data

US 2004/0261926 A1    Dec. 30, 2004

(51) Int. Cl.
    B60C 1/00       (2006.01)
    B60C 11/00      (2006.01)
(52) U.S. Cl. .................................................. 152/209.5
(58) Field of Classification Search .............. 152/209.5
    See application file for complete search history.

(56) References Cited

U.S. PATENT DOCUMENTS

| | | | |
|---|---|---|---|
| 3,157,218 A | 11/1964 | Brown | 152/330 |
| 3,486,545 A | 12/1969 | Niclas et al. | 152/155 |
| 3,830,275 A | 8/1974 | Russell | 152/357 |
| 3,853,164 A | 12/1974 | Mirtain | 152/361 DM |
| 3,907,019 A | 9/1975 | Montagne | 152/330 R |
| 3,931,844 A | 1/1976 | Mirtain | 152/360 |
| 4,249,588 A | 2/1981 | Egan | 152/357 R |
| 4,273,177 A | 6/1981 | Nybakhen | 152/360 |
| 4,373,566 A | 2/1983 | Hirakawa et al. | 152/353 G |
| 4,381,810 A | 5/1983 | Cady et al. | 152/209 R |
| 4,385,653 A | 5/1983 | Okazaki et al. | 152/209 R |
| 4,407,346 A | 10/1983 | Bandel et al. | 152/209 R |
| 4,478,266 A | 10/1984 | Pierson et al. | 152/209 R |
| 4,553,579 A | 11/1985 | Matsumoto et al. | 152/450 |
| 4,580,608 A | 4/1986 | Rampl | 152/209 R |
| 4,603,721 A | 8/1986 | Kogure et al. | 152/209 R |
| 4,635,693 A | 1/1987 | Ahagon et al. | 152/209 R |
| 4,671,333 A | 6/1987 | Rohde et al. | 152/532 |
| 4,675,349 A | 6/1987 | Palombo et al. | 523/351 |
| 4,735,247 A | 4/1988 | Makino et al. | 152/209 R |
| 4,739,811 A | 4/1988 | Rampl | 152/209 R |
| 5,046,542 A | 9/1991 | Ohta et al. | 152/209 R |
| 5,109,902 A | 5/1992 | Kobayashi | 152/209 R |
| 5,176,765 A | 1/1993 | Yamaguchi et al. | 152/209 R |
| 5,181,976 A | 1/1993 | Iwafune et al. | 152/209 R |
| 5,225,011 A | 7/1993 | Takino et al. | 152/209 R |

(Continued)

FOREIGN PATENT DOCUMENTS

CA    1169344    *  6/1984

(Continued)

OTHER PUBLICATIONS

Derwent Abstract for KR 2003046542.*

(Continued)

*Primary Examiner*—Steven D. Maki
(74) *Attorney, Agent, or Firm*—John D. DeLong

(57) ABSTRACT

A pneumatic tire comprising a tread, the tread comprising a tread cap and a tread base in a tread base to tread cap volume ratio ranging from about 0.25 to about 1; the tread cap comprising, based on 100 parts by weight rubber (phr): 100 phr of cis 1,4 polyisoprene natural rubber; from about 25 to about 50 phr of carbon black; and from about 8 to about 35 phr of silica; the tread base comprising, based on 100 parts by weight rubber (phr): 100 phr of cis 1,4 polyisoprene natural rubber; from about 25 to about 50 phr of carbon black; and from about 8 to about 35 phr of silica; wherein the tread cap has a stiffness greater than that of the tread base.

6 Claims, 1 Drawing Sheet

U.S. PATENT DOCUMENTS

Figure 1:
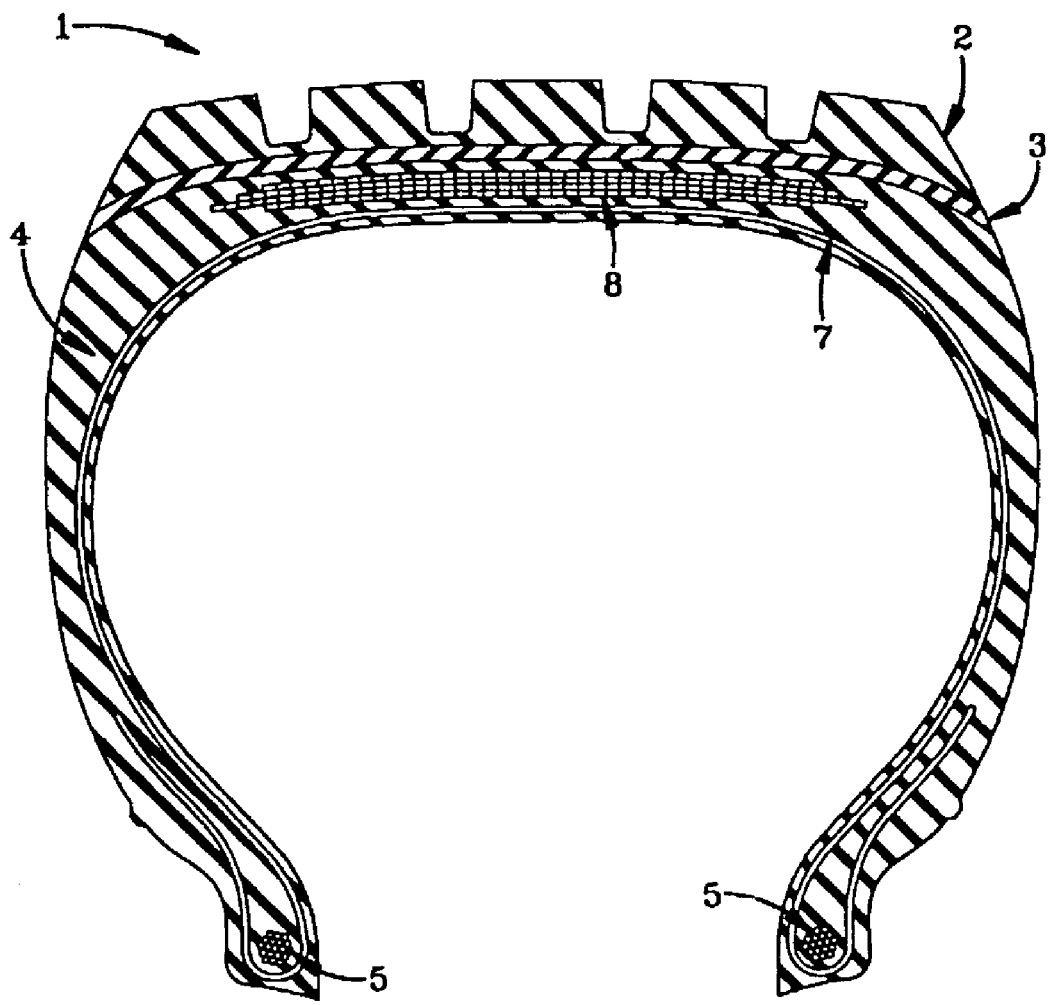

| | | | |
|---|---|---|---|
| 5,226,987 A | 7/1993 | Matsumoto et al. | 152/209 R |
| 5,228,933 A | 7/1993 | Kawabata et al. | 152/209 R |
| 5,284,195 A | 2/1994 | Sandstrom et al. | 152/209 R |
| 5,341,862 A | 8/1994 | Hashimoto et al. | 152/209 R |
| 5,417,267 A | 5/1995 | Naoi et al. | 152/209 R |
| 5,479,977 A | 1/1996 | Tamano et al. | 152/542 |
| 5,512,626 A | 4/1996 | Matsuo et al. | 524/495 |
| 5,614,041 A | 3/1997 | Dumke et al. | 152/210 |
| 5,720,831 A | 2/1998 | Aoki et al. | 152/209 R |
| 5,810,953 A | 9/1998 | Tanaka et al. | 152/209 R |
| 5,843,249 A | 12/1998 | Ryba et al. | 152/209 R |
| 6,095,217 A | 8/2000 | Nakamura et al. | 152/209.5 |
| 6,247,512 B1 | 6/2001 | Radulescu | 152/209.5 |
| 6,269,854 B1 | 8/2001 | Matsuo et al. | 152/152.1 |
| 6,336,486 B1 | 1/2002 | Iwasaki et al. | 152/209.4 |
| 6,347,653 B1 | 2/2002 | Kobayashi | 152/209.1 |
| 6,367,525 B1 | 4/2002 | Hiruma et al. | 152/152.1 |
| 6,412,532 B1 | 7/2002 | Iida et al. | 152/209.5 |
| 6,474,382 B1 | 11/2002 | Finck | 152/209.5 |
| 2002/0036041 A1 | 3/2002 | Suzuki | 152/209.5 |
| 2002/0157747 A1 | 10/2002 | Shimada et al. | 152/209.5 |
| 2003/0004262 A1 | 1/2003 | Dryol et al. | 524/525 |
| 2003/0015271 A1 | 1/2003 | Meza et al. | 152/209.5 |
| 2003/0079816 A1* | 5/2003 | Mizuno | 152/209.5 |

FOREIGN PATENT DOCUMENTS

| | | |
|---|---|---|
| EP | 0 105 822 A2 | 4/1984 |
| EP | 0341187 | 8/1989 |
| EP | 0 557101 B1 | 8/1993 |
| EP | 0 827 845 A1 | 3/1998 |
| EP | 0 869 016 A2 | 10/1998 |
| EP | 0827845 | 11/1998 |
| EP | 893281 * | 1/1999 |
| FR | 2 215 331 | 11/1975 |
| GB | 753533 | 7/1956 |
| GB | 753963 | 8/1956 |
| GB | 769258 | 3/1957 |
| GB | 810014 | 3/1959 |
| GB | 1 255 952 | 12/1971 |
| GB | 2 058 687 A | 4/1981 |
| GB | 2 150 509 A | 11/1983 |
| JP | 3-7602 * | 1/1991 |
| JP | 10-95204 * | 4/1998 |
| JP | 10-298349 * | 11/1998 |

OTHER PUBLICATIONS

European Search Report.
Patent Abstract of Japan, vol. 2003, No. 09, for JP Application No. 2001328102.

* cited by examiner

TRUCK TIRE WITH CAP/BASE CONSTRUCTION TREAD

FIELD

The present invention is direction to a pneumatic tire comprising a tread, said tread comprising a tread cap and a tread base in a tread base to tread cap volume ratio ranging from about 0.25 to about 1;

said tread cap comprising, based on 100 parts by weight rubber (phr): 100 phr of cis 1,4 polyisoprene natural rubber; from about 25 to about 50 phr of carbon black; and from about 8 to about 35 phr of silica;

said tread base comprising, based on 100 parts by weight rubber (phr): 100 phr of cis 1,4 polyisoprene natural rubber; from about 25 to about 50 phr of carbon black; and from about 8 to about 35 phr of silica;

wherein said tread cap has a stiffness greater than that of said tread base.

BACKGROUND

Pneumatic rubber tires are conventionally prepared with a rubber tread which can be a blend of various rubbers which is typically reinforced with carbon black.

In one aspect, tires such as, for example, truck tires and other relatively large tires including relatively heavy duty light truck tires, which are normally expected to be capable of supporting and carrying relatively large vehicular loads, tend to generate a greater internal temperature than comparable passenger vehicle-type tires.

The truck tire treads are typically of a cap/base construction, with the tread cap designed to be ground-contacting and, thus, contain a lug/groove ground-contacting configuration, and with the tread base underlying and supporting the tread cap and positioned between the tread cap and the tire casing. Generally, the tread cap and tread base are a co-extruded component of the tire. The tread base is not intended to normally be ground-contacting and, thus, not normally intended to have the same measure of tread properties as, for example, the tread cap properties of traction and treadwear resistance.

For some truck tire treads, particularly for tire carcasses of a bias ply construction, the tread base is relatively thick, as compared to the thickness of the tread cap, and is often of a thickness of at least 50 percent of the thickness of the associated tread cap, instead of being a relatively thin tread base of a thickness less than about 25 percent of the thickness of the associated tread cap as may be found, for example, in passenger tires. This is in contrast to radial ply tires, such as for example passenger tires and light truck tires, which often have a tread of a cap/base construction where such tread base is often relatively thin, such as being less than 25 percent of the thickness of the associated tread cap.

For such relatively heavy duty tires, heat buildup, evidenced by tire running temperature buildup, or increase, is normally unwanted, although a substantial portion of the heat buildup, or temperature increase, is relatively unavoidable during a running of the tire under load.

However, it remains to be desirable to provide a rubber tire tread for use with tires on various trucks including light to medium trucks, which will generate less heat under typical operational conditions particularly since higher tire running conditions tend to prematurely age the tire rubber and associated tire construction and, thus, tend to shorten the effective life of the tire, which may include the tire casing.

The effective life of the tire casing is considered herein to be important because it is desirable to retread the tire casing after the tire tread becomes worn.

On the road, medium truck tires are not only used for the typical, paved road applications for which they are designed, but also on the roads which could be defined as mixed service application, having rocks and gravel present. This type of service causes tread chipping/chunking, therefore ending tire life prematurely and causing customer dissatisfaction. Furthermore it is desirable to improve a chip/chunk resistance of mixed service tires and therefore their lifetime.

In another aspect, it is desired to provide such a tire which can generate less heat under operational conditions, yet have acceptable treadwear and traction (skid resistance).

It is envisioned that such tread would be of a cap/base construction where the tread cap and base are of natural rubber compositions reinforced with carbon black and optionally with a combination of carbon black and silica. A cap/base construction for tire treads is well known to those skilled in such tire tread art. For example, see U.S. Pat. No. 3,157,218 which is intended to be incorporated herein by reference as being illustrative of such tread construction.

Conventionally, truck tire (including bus tires) tread cap rubber compositions are composed predominately of natural rubber (natural cis 1,4-polyisoprene rubber) in order to achieve satisfactory heat durability and cool running characteristics. Other elastomers are often mixed with the natural rubber for such tread caps such as, for example, styrene/butadiene copolymer rubber and sometimes cis 1,4-polybutadiene rubber.

In practice for preparation of tire treads, various rubbers, or elastomers, are typically evaluated, selected and blended for a purpose of achieving desired tire tread properties and particularly a balance of tire tread characteristic properties, mainly, rolling resistance, traction and wear. Typically, however, the chip/chunk performance of such tires is poor, resulting in premature retreading or scrapping of tires.

For various applications utilizing rubber, including applications such as tires and particularly tire treads, sulfur-cured rubber is utilized which contains substantial amounts of reinforcing filler(s). Carbon black is commonly used for such purpose and normally provides or enhances good physical properties for the sulfur-cured rubber. Particulate silica might also sometimes be used for such purpose, particularly if the silica is used in conjunction with a coupling agent. In some cases, a combination of silica and carbon black has been utilized for reinforcing fillers for various rubber products, including treads for tires.

The term "phr" where used herein, and according to conventional practice, refers to "parts of a respective material per 100 parts by weight of rubber, or elastomer".

In the description of this invention, the terms "rubber" and "elastomer", where used herein unless otherwise prescribed, are used interchangeably. The terms "rubber composition", "compounded rubber" and "rubber compound" where used herein unless otherwise prescribed, are used interchangeably to refer to "rubber which has been blended or mixed with various ingredients or materials", and such terms are well known to those having skill in the rubber mixing, or rubber compounding, art.

SUMMARY AND PRACTICE OF THE INVENTION

There is disclosed a pneumatic tire comprising a tread, said tread comprising a tread cap and a tread base in a tread base to tread cap volume ratio ranging from about 0.25 to about 1;

said tread cap comprising, based on 100 parts by weight rubber (phr): 100 phr of cis 1,4 polyisoprene natural rubber; from about 25 to about 50 phr of carbon black; and from about 8 to about 35 phr of silica;

said tread base comprising, based on 100 parts by weight rubber (phr): 100 phr of cis 1,4 polyisoprene natural rubber; from about 25 to about 50 phr of carbon black; and from about 8 to about 35 phr of silica;

wherein said tread cap has a stiffness greater than that of said tread base.

The tread cap and tread base each comprise cis 1,4-polyisoprene natural rubber. In one embodiment, the tread cap and tread base each comprise 100 phr cis 1,4-polyisoprene natural rubber.

The tread cap and base natural rubber elastomer compositions may also be modified by the addition of up to about 30, and alternatively about zero to about 20, or about 10 to about 20, phr of one or more additional synthetic diene-based elastomer(s).

The said additional synthetic elastomers for the said tread cap or for said tread base may be selected from, for example, emulsion polymerization prepared styrene/butadiene copolymer having a bound styrene content of about 20 to about 40, or about 20 to about 30, weight percent and a Tg in a range of about −50° C. to about −65° C. (E-SBR-B), organic solution polymerization prepared styrene/butadiene copolymer (S-SBR), cis 1,4-polybutadiene elastomer, medium to high vinyl polybutadiene rubber having a vinyl content from about 30 to about 90 percent, trans 1,4-polybutadiene elastomer, isoprene/butadiene copolymer rubber and styrene/isoprene/butadiene terpolymer rubber. Such isoprene/butadiene copolymer elastomer may have an isoprene content in a range of about 5 to about 90, alternatively about 30 to about 70, percent.

The said tread cap or base rubber compositions, while being carbon black reinforced, may also contain a blend of silica and carbon black with silica ranging from zero to about 100 weight percent of the reinforcing filler. With the silica, a silane-coupling agent may also used. Such silane coupling agents typically have a silane moiety reactive with the surface of the silica and a moiety interactive with said elastomers.

The rubber blends for the tread cap and tread base containing the said required cis 1,4-polyisoprene natural rubber is considered herein to be an important feature of the invention designed to reduce heat build-up properties of the truck tread.

In the practice of this invention, a contribution of the cis 1,4-polyisoprene natural rubber for the tread cap is believed to, in one aspect, aid in enhancing or promoting the tire tread's abrasion and chip/chunk resistance property, particularly where it is applied to tires, such as truck and bus tires intended to operate in a relatively fast truck tire treadwear condition as would be expected for truck tires operating under loaded conditions.

The synthetic elastomers can be prepared, for example, by organic solution polymerization of respective monomers and their preparation is well known to those skilled in such art.

The use of cis 1,4-polyisoprene rubber, particularly and preferably as natural rubber, in tire treads is well known to those having skill in such art.

It is to be appreciated that the elastomer composition relies upon a reinforcing filler which is composed of carbon black and silica and, optionally, an accompanying silica coupler for the reinforcing effect of the silica filler.

It is further considered herein that the truck tires of this invention have an appreciably greater need for relatively cooler running tires than passenger tires which are expected to be utilized for substantially reduced loads. For a tire tread to contribute significantly to the cooler running of a tire, it is considered herein that a tread of cap/base construction is desirable where the tread cap and base is primarily composed of cis 1,4-polyisoprene natural rubber, and where the tread cap and tread base compositions cooperate to promote such effect. In practice, such tread is created by co-extruding the tread cap and tread base together through a singular die to form the extruded tread construction. The compounded rubber compositions are extruded through the die at a temperature, for example, in a range of about 100° C. to about 125° C., often typically about 110° C. and, thus, is considered as being a relatively hot extrusion process, although such actual extrusion temperatures themselves are considered normal for a rubber extrusion process. The extruded tread stock is then built onto a rubber tire casing to create an assembly thereof. The assembly is then vulcanized, or cured, at an elevated temperature. Such overall process is well known to those skilled in such art. In this manner then, by the aforesaid co-extrusion process and the co-vulcanization of the tread cap and tread base, the tread cap and tread base are considered herein to be an integral, cooperative, unit of the tire. Therefore, it is considered herein that the tread cap and tread base desirably cooperate to promote the cooler running effect for the tire. By the term "cooler running for the tire tread" it is meant that "internal operating temperatures are sufficiently low so as to reduce, or retard, heat degradation of the tire tread rubber compositions". An example of such cooler running effect is intended to be manifested in a longer service life for the tire carcass, or casing. It is known to those having skill in truck or bus tire usage that cooler running tire treads are desirable in order to lengthen, or increase, tire life insofar as heat durability is concerned.

The accompanying drawings are provided for further understanding of the invention, although it is not intended that the invention be limited to the presentation of the drawings.

FIG. 1 is a cross-sectional view of a vulcanized tire showing a tread with a cap/base construction where the tread cap is intended to be of a rib and groove configuration, and where the tread base supports the tread cap and extends to the outer side surface of the tire, together with a portion of a supporting radial ply casing. The tire casing is the portion of the tire which conventionally includes the tirG's two spaced-apart bead portions, crown portion composed of the circumferential tread and supporting belts, and connecting sidewalls. Such tire casing construction is well known to those skilled in such art. The tire casing might sometimes be referred to as a "tire carcass".

Figure 2:
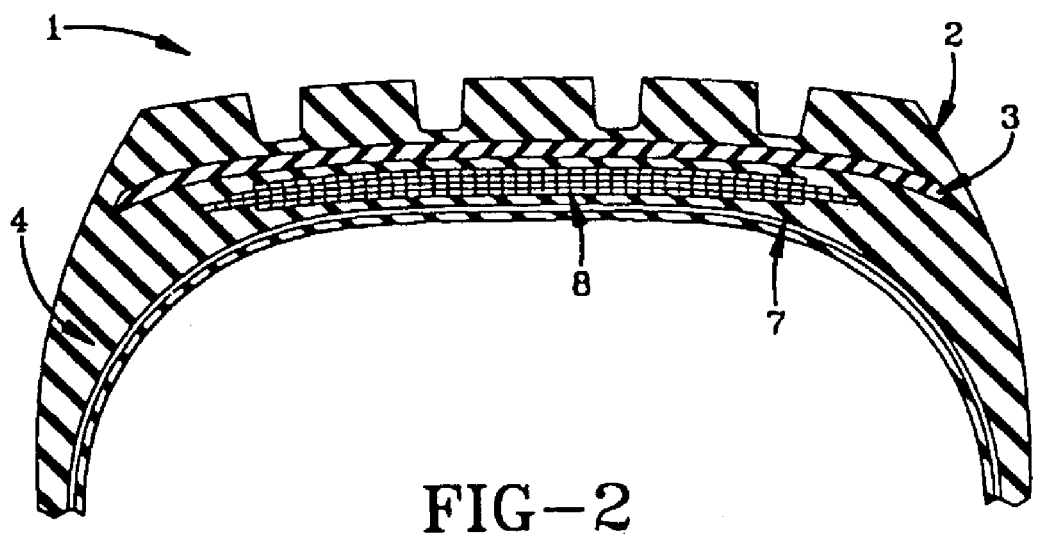

FIG. 2 is a cross-sectional view of a vulcanized tire showing a tread with a cap/base construction where the tread cap is intended to be of a rib and groove configuration, wherein the tread base supports the tread cap and terminates within the shoulder region of the tire casing.

Referring to the drawings, a tire construction 1 is provided with a circumferential tread component composed of a tread cap 2 and tread base 3 construction. The tread cap 2 and tread base 3 are a co-extruded component of the tire 1. The tire has a carbon black reinforced rubber casing 4 which is composed of spaced beads 5 encased with carbon black reinforced rubber, carbon black reinforced rubber sidewalls 6 and supporting casing plies 7 and circumferential belt 8. In one aspect, the casing ply 7 of the casing 4, for the truck tire, has steel cord reinforcement.

The rubber tread base 3 is carbon black reinforced with carbon black and silica. The sidewall rubber 6 and rubber for the beads 5 are reinforced with at least about 40 phr of carbon black. The tread base elastomer is cis 1,4-polyisoprene natural rubber.

The rubber tread cap 2 is reinforced with a filler composed of carbon black and precipitated silica.

To obtain a desirable level of chip/chunk resistance, in addition to the presence of cis 1,4-polyisoprene, carbon black, and silica in the tread cap and tread base, the tread cap and base should be present within a prescribed volume ratio, and each should have a prescribed relative stiffness.

To obtain a desirable level of chip/chunk resistance in the tread, the tread must comprise a tread cap and a tread base in a tread base to tread cap volume ratio ranging from about 0.25 to about 1. In another embodiment, the tread comprise a tread cap and a tread base in a tread base to tread cap volume ratio ranging from about 0.5 to about 1.

To obtain a desirable level of chip/chunk resistance in the tread, the tread cap has a stiffness greater than that of said tread base. The stiffness may be characterized by several methods including, but not limited to, the 300 percent modulus and the dynamic modulus G'. The 300% modulus values tests may be measured following ASTM Test D412-92, method B.

For the G' values, which are sometimes referred to as the "shear storage modulus" or "dynamic modulus", reference may be made to *Science and Technology of Rubber*, second edition, 1994, Academic Press, San Diego, Calif., edited by James E. Mark et al, pages 249–254. The use of the storage modulus, E', to characterize rubber compositions is well known to those having skill in such art.

The tangent delta, or "tan.delta", is a ratio of the shear loss modulus, also known as G", to the shear storage modulus (G'). These properties, namely the G', G" and tan.delta, characterize the viscoelastic response of a rubber test sample to a tensile deformation at a fixed frequency and temperature, measured at 100° C.

The tan.delta and shear storage modulus (G') are well known to those skilled in the rubber composition characterization art, particularly as it relates to tires and tire treads. The shear storage modulus (G') values are indicative of rubber compound stiffness which can relate to treadwear rates and evenness of treadwear. The tan.delta value at 100° C. is considered as being indicative of hysteresis, or heat loss.

In order to obtain the desired chip/chunk resistance in the tread, the tread cap may have a 300 percent modulus ranging from about 10 to about 12 MPa. In another embodiment, the tread cap may have a dynamic modulus G' ranging from about 1.2 to about 1.6 MPa.

In order to obtain the desired chip/chunk resistance in the tread, the tread base may have a 300 percent modulus ranging from about 8 to about 11 MPa. In another embodiment, the tread base may have a dynamic modulus G' ranging from about 1 to about 1.3 MPa.

It is readily understood by those having skill in the art that the rubber composition of the tread rubber would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, silica and carbon black. As known to those skilled in the art, depending on the intended use of the sulfur vulcanizable and sulfur-vulcanized material (rubbers), the additives mentioned above are selected and commonly used in conventional amounts.

Typical additions of reinforcing fillers for the tread cap and base, such as carbon black, are usually in an amount of about 25 to about 50 phr. In one embodiment, the tread cap may contain from about 25 to about 45 phr of carbon black. In one embodiment, the tread base may contain from about 25 to about 35 phr of carbon black. In one embodiment, the carbon black is a SAF black. Typical additions in the tread cap and base of reinforcing fillers such as silica are usually in an amount of about 8 to about 35 phr, optionally together with a silica coupler. In one embodiment, the tread cap may contain from about 9 to about 25 phr of silica. In one embodiment, the tread base may contain from about 5 to about 15 phr of silica.

Typical amounts of tackifier resins, if used, comprise about 0.5 to about 10 phr, usually about 1 to about 5 phr. Typical amounts of processing aids comprise about 1 to about 30 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), pages 344–346. Typical amounts of antiozonants comprise about 1 to 5 phr. Typical amounts of fatty acids, if used, which can include stearic acid comprise about 0.5 to about 4 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The vulcanization is conducted in the presence of a sulfur-vulcanizing agent. Examples of suitable sulfur-vulcanizing agents include elemental sulfur (free sulfur) or sulfur donating vulcanizing agents, for example, an amine disulfide, polymeric polysulfide or sulfur olefin adducts. Preferably, the sulfur-vulcanizing agent is elemental sulfur. As known to those skilled in the art, sulfur-vulcanizing agents are used in an amount ranging from about 0.5 to about 4 phr, with a range of from about one to about 2.5, being preferred.

Accelerators are used to control the time and/or temperature required for vulcanization and to improve the properties of the vulcanizate. Retarders are also used to control the vulcanization rate. In one embodimerit, a single accelerator system may be used, i.e., primary accelerator. Conventionally and preferably, a primary accelerator(s) is used in total amounts ranging from about 0.5 to about 4, preferably about 0.8 to about 2.5, phr. In another embodiment, combinations of a primary and/or a secondary accelerator might be used, with the secondary accelerator being used in amounts of about 0.05 to about 3 phr, for example, in order to activate and to improve the properties of the vulcanizate. Suitable types of accelerators that may be used in the present invention are amines, disulfides, guanidines, thioureas, thiazoles, thiurams, sulfenamides, dithiocarbamates and xanthates.

Preferably, the primary accelerator is a sulfenamide. If a second accelerator is used, the secondary accelerator is preferably a guanidine, dithiocarbamate or thiuram compound. The presence and relative amounts of sulfur-vulcanizing agent and accelerator(s) are not considered to be an aspect of this invention which is more primarily directed to a truck tire with a tread of cap/base construction where the tread cap is comprised of E-SBR-B and the tread base is comprised of natural rubber.

The presence and relative amounts of the above additives are not considered to be an aspect, except as may hereinbefore be set forth, of the present invention which is more primarily directed to the tire with cap/base construction utilizing various elastomers in the tread cap and tread base.

The tire can be built, shaped, molded and cured by various methods which will be readily apparent to those having skill in such art.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire comprising a tread, said tread comprising a tread cap and a tread base;
    said tread cap comprising, based on 100 parts by weight rubber (phr): 100 phr of cis 1,4 polyisoprene natural rubber; from about 25 to about 45 phr of carbon black; and from about 8 to about 35 phr of silica;
    said tread base comprising, based on 100 parts by weight rubber (phr): 100 phr of cis 1,4 polyisoprene natural rubber; from about 25 to about 50 phr of carbon black; and from about 8 to about 35 phr of silica;
    wherein said tread cap has a stiffness greater than that of said tread base, said stiffness characterized by a 300 percent modulus, said tread cap having a 300 percent modulus ranging from about 10 MPa to about 12 MPa and said tread base having a 300 percent modulus ranging from about 8 MPa to about 11 MPa; said tread comprising a tread base to tread cap volume ratio ranging from about 0.5 to about 1.

2. The pneumatic tire of claim 1, wherein said tread cap comprises from about 9 to about 25 phr of silica.

3. The pneumatic tire of claim 1, wherein said tread base comprises from about 5 to about 15 phr of silica and from about 25 to about 35 phr of carbon black.

4. A pneumatic tire comprising a tread, said tread comprising a tread cap and a tread base;
    said tread cap comprising, based on 100 parts by weight rubber (phr): 100 phr of cis 1,4 polyisoprene natural rubber; from about 25 to about 45 phr of carbon black; and from about 8 to about 35 phr of silica;
    said tread base comprising, based on 100 parts by weight rubber (phr): 100 phr of cis 1,4polyisoprene natural rubber; from about 25 to about 50 phr of carbon black; and from about 8 to about 35 phr of silica; wherein said tread cap has a stiffness greater than that of said tread base, said stiffness characterized by a modulus G', said tread cap having G' ranging from about 1.2 MPa to about 1.6 MPa and said tread base having G' ranging from about 1.0 MPa to about 1.3 MPa; said stiffness further characterized by a 300 percent modulus, said tread cap having a 300 percent modulus ranging from about 10 MPa to about 12 MPa and said tread base having a 300 percent modulus ranging from about 8 MPa to about 11 MPa; said tread comprising a tread base to tread cap volume ratio ranging from about 0.5 to about 1.

5. The pneumatic tire of claim 1, wherein said tread cap comprises from about 9 to about 25 phr of silica.

6. The pneumatic tire of claim 1, wherein said tread base comprises from about 5 to about 15 phr of silica and from about 25 to about 35 phr of carbon black.

* * * * *